June 15, 1943.  T. R. PAULSEN  2,321,615
BULLDOZER
Filed Aug. 9, 1941   2 Sheets-Sheet 2

Thomas R. Paulsen.
INVENTOR.
BY Hoar & Ruhloff
ATTORNEYS

Patented June 15, 1943

2,321,615

UNITED STATES PATENT OFFICE

REISSUED
MAR 6 1945

2,321,615

BULLDOZER

Thomas R. Paulsen, South Milwaukee, Wis., assignor to Bucyrus-Erie Company, South Milwaukee, Wis., a corporation of Delaware Application August 9, 1941, Serial No. 406,090

4 Claims. (Cl. 37—145)

My invention relates to new and useful improvements in bulldozers, and more particularly to that type of bulldozer in which the scraping blade is pushed ahead of a tractor.

Such devices are usually designed for attachment to some conventional type of tractor. They consist of a blade, two arms pivoted on the tractor for pushing the blade, and means to raise and lower either arm with a certain degree of independence from the lowering and raising of the other arm. The last-mentioned means usually consists of one or two hydraulic cylinders actuated by a pump driven by the engine of the tractor.

If two such cylinders are used, it is convenient to have them controlled by a single control-valve.

It is the principal object of my invention to add to the conventional bulldozer a ripper, so contrived that they can be operated respectively by one and the same mechanism.

In addition to my principal object, above stated, I have worked out a number of novel and useful details, which will be readily evident as the description progresses.

My invention consists in the novel parts and in the combination and arrangement thereof, which are defined in the appended claims, and of which one embodiment is exemplified in the accompanying drawings, which are hereinafter particularly described and explained.

Throughout the description, the same reference number is applied to the same member or to similar members.

Figure 1:
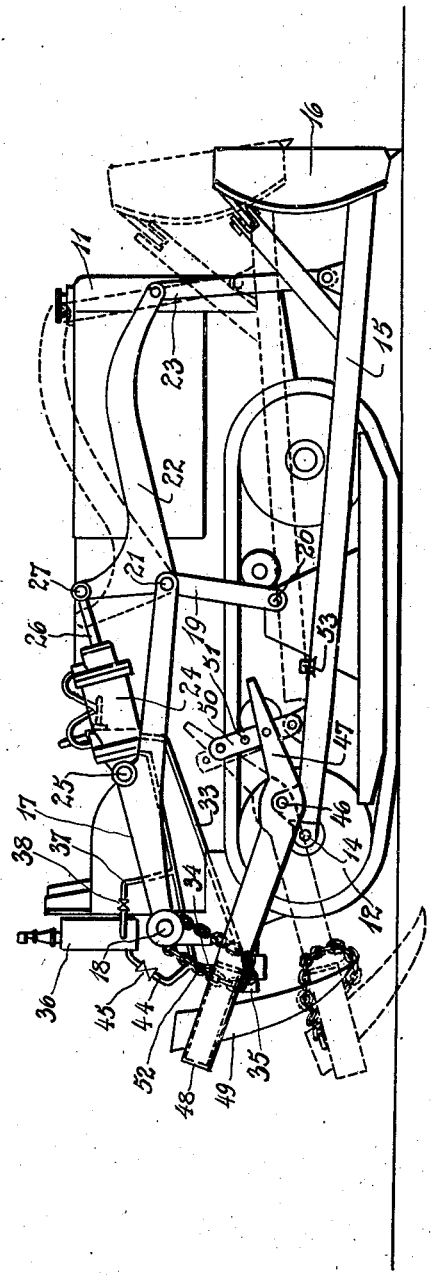
Figure 1 is a side elevation of a tractor, bulldozer and ripper, embodying my invention, showing in full lines the mechanism in bulldozing position, and in dotted lines the mechanism in ripping position.
Figure 2:
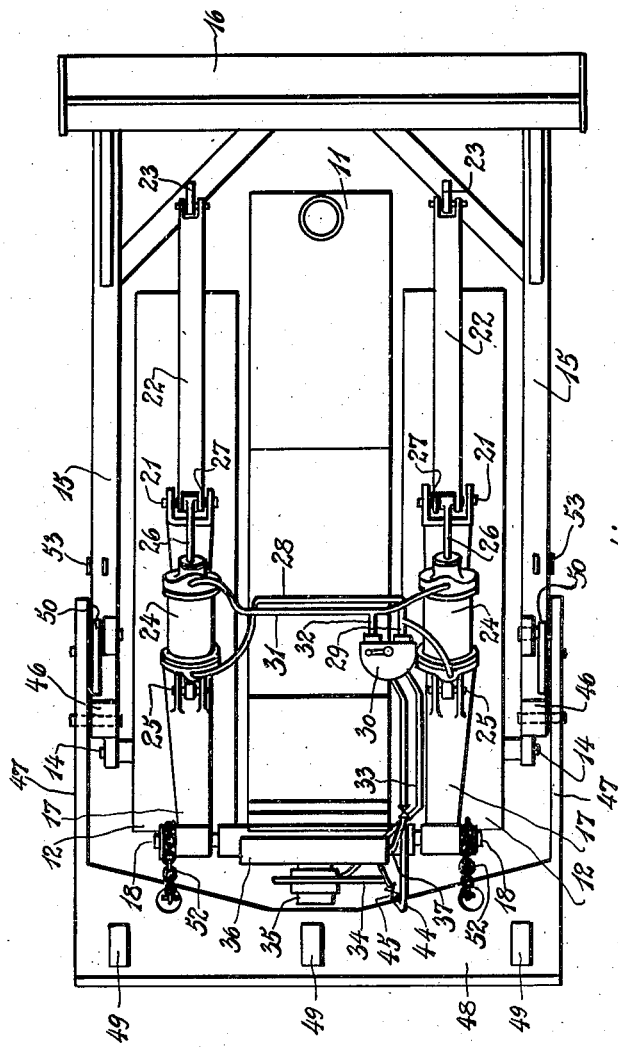
Figure 2 is a plan view of my invention.

Referring now to the figures, we see that 11 is a conventional tractor, mounted on creeping traction 12. These creeping traction elements are pivoted on propelling shaft 13, and their front ends have considerable freedom to rise and fall to conform to unevenness of the ground.

Pivoted to each traction element 12 at 14 is a forwardly projecting arm 15. These arms support and impel a scraper blade 16.

On each side of the tractor there is a link 17 pivoted to the rear of the tractor at 18, and a link 19 pivoted to the creeping traction at 20. These two links are pivoted together at 21, and at this point is also pivoted the elbow of a bell-crank 22.

The front end of each bell-crank supports one side of the blade 16 through a link 23.

There are two cylinders 24, each pivoted at 25 on one of the links 17. The piston rod 26 of each cylinder is pivoted at 27 to the short arm of the bell-crank 22.

The rear ends of the two cylinders are connected by a pipe 28, from which a pipe 29 leads to a control-valve 30. The front ends of the two cylinders are similarly connected by a pipe 31, from which a pipe 32 leads to the control-valve 30.

The control-valve may be of any conventional design, the details of which are not shown as they form no part of my invention. But the valve should have four positions, namely: (1) to pump from the rear of the cylinders into the front, and thus retract the pistons; (2) to pump from the front of the cylinders into the rear, and thus thrust the pistons out; (3) to close both pipe 29 and pipe 32, and thus hold the pistons; and (4) to open pipe 29 to pipe 32, and thus permit free floating of the piston.

From the valve a pressure pipe 33 and a suction pipe 34 lead to a pump 35, actuated in any conventional manner by the main engine of the tractor. From a fluid tank 36, there runs to suction pipe 34, a pipe 37 with a check valve 38, for the purpose of keeping the system always filled with fluid. From the suction pipe 34 to the tank 36, there runs a pipe 44 with a pressure relief valve 45 to permit compensation for the space occupied by the piston rods 26 within the cylinders 24 when the pistons are being retracted and yet hold them against unintended retracting.

It will be noted that pivot point 14, for the rear ends of my arms 15, is on the ends of the rear axle of the creeping traction. This is advisable, but not essential.

Upwardly extending from each push-arm 15, adjacent this point 14, is a bracket 46, to which is pivoted the elbow of a bell-crank-shaped ripper arm 47. This pivot need not be actually on push-arms 15, but preferably should be adjacent point 14. Whenever in the claims, I use the phrase "pivotally supported by" it is intended to be generic to the pivotal support of ripper arm 47 on the push arm 15, and any other equivalent support therefor.

Ripper arms 47 carry a cross piece 48, which in turn carries the ripper teeth 49. Pivotally supported by each push-arm 15 is a link 50, having a series of holes 51. The forward portion of each ripper arm 47 has a cooperating hole whereby it can be secured to this link 50, by any appropriate means such as a bolt.

The rearward portion of the ripper assembly carries appropriate means, such as a chain 52, for securing the ripper in elevated position, as by hooking the chain over the projecting end of pivot 18 on the tractor. But any other comparable means may be employed for this purpose.

When not in use, link 50 can lie forward in bracket 53 on push-arm 15.

The operation of my invention is as follows:

When chains 52 are hooked over pivots 18, and links 50 are lying in brackets 53, my combined bulldozer and ripper operates as a conventional bulldozer.

To operate it as a combined ripper and bulldozer, the blade 16 is lowered to the ground, as shown in full lines in Figure 1. Links 50 are then swung up and pivotally secured to ripper arms 47, and chains 52 are detached from pivots 18.

Raising the bulldozer blade now lowers the ripper, and vice versa.

Other tools than the blade 16 could be carried by the push-arms 15.

It is to be understood that the same principles can be employed to attach my ripper to any other comparable form of dirt-moving equipment, for control by the same controls, selectively or simultaneously.

Having now described and illustrated one form of my invention, I wish it to be understood that my invention is not to be limited to the specific form or arrangement of parts hereinbefore described except as specified in the appended claims.

I claim:

1. In a combined bulldozer and ripper, for attachment to a tractor, the combination of: a pair of push-arms, pivotally attachable to a tractor; means supportable by the tractor, for raising and lowering these arms; a transverse blade, carried by these arms; two ripper arms, each pivotally supported by one of the push-arms adjacent its rear end; a link pivoted on each push-arm; means on each push-arm for supporting its link in inactive position; means for operatively connecting each link to its ripper arm; a transverse tooth-carrying member, supported by the ripper arms, ripper teeth carried by this transverse member; and means for supporting the ripper arms, directly by the tractor, in inactive elevated position.

2. In a combined tool and ripper, for attachment to a tractor, the combination of: a pair of push-arms; means supportable by the tractor, for raising and lowering these arms; a tool, carried by these arms; two ripper arms; the push-arm and the ripper arm on each side being pivotally supported by the tractor at points closely adjacent to each other; a link pivoted on each push arm; means for operatively connecting each link to its ripper arm; ripper teeth carried by the ripper arms; and means for supporting the ripper arms, directly by the tractor in inactive elevated position.

3. In a combined pushed tool and pulled tool, for attachment to a tractor, the combination of: a pushed tool; means for attaching this tool to a tractor so that it may be pushed thereby; means, carried by the tractor, for moving this tool into and out of operative position; a pulled tool; means whereby this pulled tool may be pulled by the tractor; means whereby the pulled tool can be operatively connected to the pushed tool so as to be moved into and out of operative position by the motion of the pushed tool; and means whereby the pulled tool, although still maintaining its pulling connection to the tractor, but operatively disconnected from the pushed tool, can be locked in raised position, inactive in spite of motion of the pushed tool.

4. In a combined pushed tool and pulled tool, for attachment to a tractor, the combination of: a pushed tool; means for attaching this tool to a tractor so that it may be pushed thereby; a pulled tool; means whereby this pulled tool may be pulled by the tractor; means, carried by the tractor, for moving one tool into and out of operative position; means, whereby said one tool can be operatively connected to the other tool so as to be moved into and out of operative position by the motion of the other tool; and means whereby said one tool, although still maintaining its operative connection to the tractor, but operatively disconnected from the other tool, can be locked in raised position, inactive in spite of motion of the other tool.

THOMAS R. PAULSEN.